(12) United States Patent
Schiffer et al.

(10) Patent No.: US 8,781,609 B2
(45) Date of Patent: Jul. 15, 2014

(54) SIGNAL PROCESSING NETWORK

(75) Inventors: Peter Schiffer, Schonaich (DE); Stephen J. Yutkowitz, Cincinnati, OH (US)

(73) Assignee: Siemens Industry, Inc., Alpharetta, GA (US)

(*) Notice: Subject to any disclaimer, the term of this patent is extended or adjusted under 35 U.S.C. 154(b) by 550 days.

(21) Appl. No.: 11/677,707

(22) Filed: Feb. 22, 2007

(65) Prior Publication Data

US 2007/0268847 A1    Nov. 22, 2007

Related U.S. Application Data

(60) Provisional application No. 60/801,958, filed on May 19, 2006.

(51) Int. Cl.
*G05B 19/04* (2006.01)
*G05B 17/02* (2006.01)

(52) U.S. Cl.
USPC ............................................. 700/56; 700/29

(58) Field of Classification Search
USPC ................... 700/56, 29; 703/2; 717/104, 105
See application file for complete search history.

(56) References Cited

U.S. PATENT DOCUMENTS

| | | | | |
|---|---|---|---|---|
| 5,796,922 | A * | 8/1998 | Smith | 706/23 |
| 2004/0210426 | A1 * | 10/2004 | Wood | 703/2 |
| 2005/0107915 | A1 * | 5/2005 | Reyier et al. | 700/245 |
| 2007/0250299 | A1 * | 10/2007 | Paxson et al. | 703/11 |

FOREIGN PATENT DOCUMENTS

| | | |
|---|---|---|
| JP | 2004139597 A1 | 5/2004 |
| JP | 2004139599 A1 | 5/2004 |

OTHER PUBLICATIONS

International Search Report dated Mar. 4, 2007 for Application No. PCT/US2007/008398.
Valera A et al, "Interactive on-line evaluation of robot motion control", 1999 IEEE International Conference on Kohala Coast, HI, USA Aug. 22-27 1999, Piscataway, NJ USA, IEEE, US, vol. 2, Aug. 22, 1999, pp. 1039-1043.
N.N.: "Writing S-Functions", Jul. 2002, Mathworks Inc., Natick MA, XP002462886 Retrieved from the Internet: URL: http://www1.uni-hamburg.de/RRZ/Software/Matlab/Dokumentaion/help/pdf_doc/simulink/sfunction.pdf>, p. 1-11.
Ivan Masar, Rolf Gabler: "An Integrated Environment for the Modeling, Simulation, and Rapid Design of Control Algorithms for Mobile Robots", MATHAB Digest, Sep. 2005, XP002462885, Retrieved from the Internet: URL: http://www.mathworks.de/company/newsletters/digest/2005/sept/mobile_robots.html>.
Translation of JP Office Action dispatched on May 15, 2012 corresponding to JP Patent Application No. 2009-512005 filed Apr. 3, 2007.

(Continued)

*Primary Examiner* — Sean Shechtman
*Assistant Examiner* — Steven Garland

(57) ABSTRACT

A system, method, and device for generating a signal processing network for deployment on a motion control system are disclosed. The exemplary system may have a module that supplies one or more signal processing units represented in data format using existing compiled and linked code. Another module provides a dedicated interface with the motion control system. The system may also have a module that supplies each signal processing unit with multiple inputs and multiple outputs and a module that routes the inputs and the outputs between the one or more signal processing units.

19 Claims, 2 Drawing Sheets

(56) References Cited

OTHER PUBLICATIONS

Wikipedia, found at http://en.wikipedia.org/w/index.php?title=Linker_(computing)&oldid=23371686; Others; 2005; US.

Bodo Hasubek; XP007913076; Thesis, Institute for Electrical Machines, Traction and Drives, Dept. of Electrical Engineering, Technical University of Braunschweig, Jan. 1995; Others; 1995; DE.

* cited by examiner

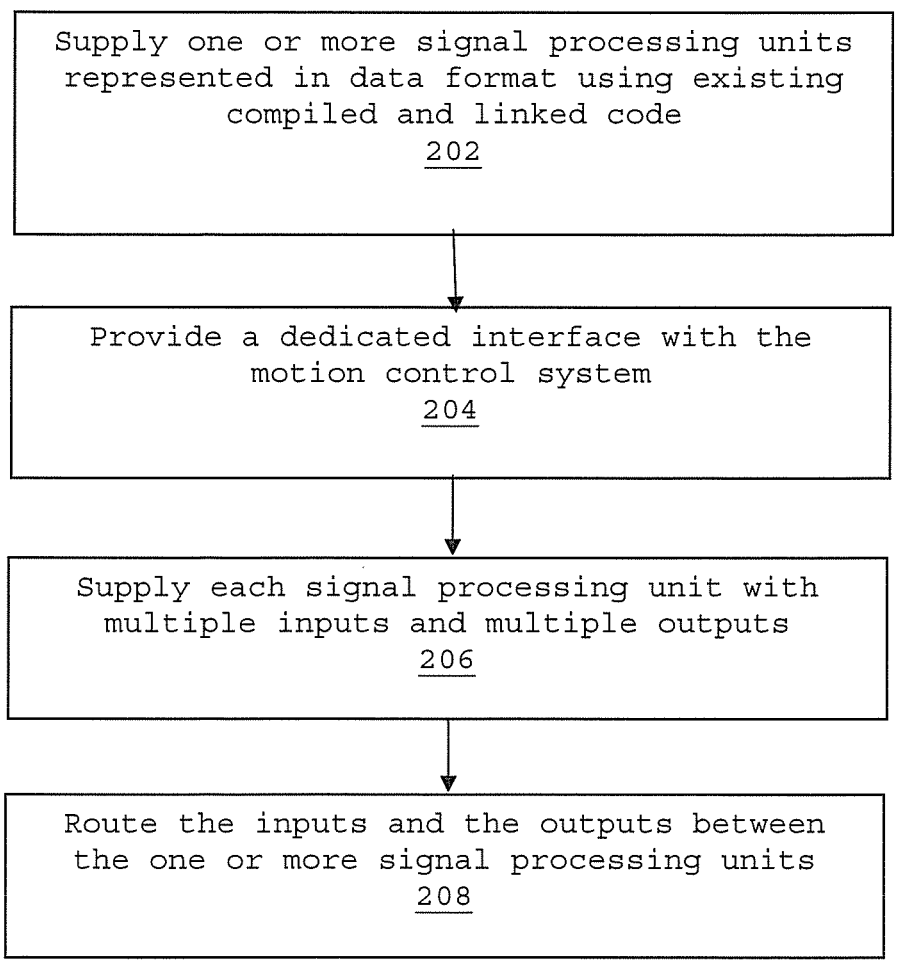

SIGNAL PROCESSING NETWORK

CROSS REFERENCE TO RELATED APPLICATIONS

This application claims priority to U.S. Provisional Patent Application No. 60/801,958 filed May 19, 2006, entitled "Signal Processing Network," which is incorporated fully herein by reference.

TECHNICAL FIELD

The present invention relates to signal processing and more particularly, to a device, method, and system for signal processing network ("SPN") for deployment in control systems.

BACKGROUND INFORMATION

Concepts similar to SPN are known to exist in a number of forms. A process monitoring application called IPM had previously been developed as a joint effort between Siemens and Heller AG. IPM is currently a product that runs on the Sinumerik 840D. IPM is owned by Siemens and marketed by Heller as an optional feature for its machines. IPM has a software component known as a "Signal Correction Chain." The signal correction chain serves the role of signal correction as described herein in the discussions related to process monitoring. Like SPN, the signal correction chain is composed of computation blocks that serve the role of executing a specific type of equation and the output from a computation block is routed to the input of another computation block. Unlike SPN, the signal collection in IPM has highly limited topologies, enables only a single input and a single output from each block, and may be limited in how the blocks are parameterized as a consequence of the data format used to represent the blocks. Furthermore, the signal correction concept has not been used for servo control or simulation purposes.

A commercial product SIMULINK® is sold and marketed by "The Mathworks" company. SIMULINK® is a large and powerful software package that is essentially a differential equation solver that uses block diagrams to represent the dynamic systems to be simulated. SIMULINK® blocks are similar to SPU's, in that they can have one or more inputs, one or more outputs, may be parameterized, and serve some specific computational role. The entire block diagram or "model" may be represented as a data format. Normally SIMULINK® runs in a non-embedded environment such as on a PC platform or Unix workstation. However, the Mathworks offers as an extension to SIMULINK®, a product known as REAL TIME WORKSHOP®. REAL TIME WORKSHOP® has the ability to compile SIMULINK® models to executable code that runs on a certain target real time platform. One major difference between REAL TIME WORKSHOP® in combination with SIMULINK® and the SPN is that REAL TIME WORKSHOP® generates, compiles, and links run-time code while the SPN uses data to configure already existing compiled and linked code. Other differences are that SPN uses XML to represent its definition and provides dedicated interfaces to the motion controller for the purpose of monitoring, failure detection, servo control, and simulation. Other unique aspects of SPN are described in the description of details herein.

Alternatives

Several alternative strategies for providing a mechanism for flexibly specifying signal processing networks have been considered. One alternative is to automatically generate executable code from a higher level description of the SPN. High level descriptions could be accomplished using modeling environments such as SIMULINK®, a CASE tool, or XML. One disadvantage of auto-generated code may be the possibility that the user of such software might feel uncomfortable knowing that the code had been auto-generated. Another consideration for auto-generated code is in the area of software testing—how can an environment with auto-generated code be tested in a comprehensive way?

Another alternative is an open architecture interface that allows a software developer to generate a fixed model as a loadable executable code. The execution algorithms are fixed but may be parameterized by data, for example as XML. The advantage of a general purpose OA interface is that programming languages such as C or c++provide the possibility of developing highly elaborate algorithms that might not be possible by combining instances of a finite set of SPU types into a network. One disadvantage of such an interface may be that it limits the use cases (fields of application). Taking the process monitoring use case as an example, new ideas for signal correction and failure detection require development of new source code. This requires coordination of software releases between the products that provide the setup utility and the products that provide the real time signal correction. In the case of servo control, the setup engineer often may not have the skills or tools required to develop, build, and deploy real time software in the field at the machine.

SUMMARY

The present invention is a novel device, system, and method for generating a signal processing network for deployment on a motion control system. The exemplary system may have one or more signal processing units represented in data format using existing compiled and linked code, each signal processing unit having the ability of multiple inputs and multiple outputs. The system may also have one or more signal flow connection for routing the inputs and the outputs between the one or more signal processing units.

The invention may include the following embodiments. In one exemplary embodiment the input may relate to monitoring a motion control system. In another exemplary embodiment the input may relate to a failure detection system. In another embodiment, the input may relate to operating a motion control system. In yet another embodiment, the input may relate to simulating a motion control system. The data format may be XML or a similar language. The data format may be used to specify the signal processing topology. In one example, the data format specifies the types of processing equations used by the signal processing network and/or parameterizations of equations.

It is important to note that the present invention is not intended to be limited to a system or method which must satisfy one or more of any stated objects or features of the invention. It is also important to note that the present invention is not limited to the exemplary embodiments described herein. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings herein:

FIG. 2 is a flow chart of a method for a signal processing network according to first exemplary embodiment of the present invention.

DETAILED DESCRIPTION

Figure 1:
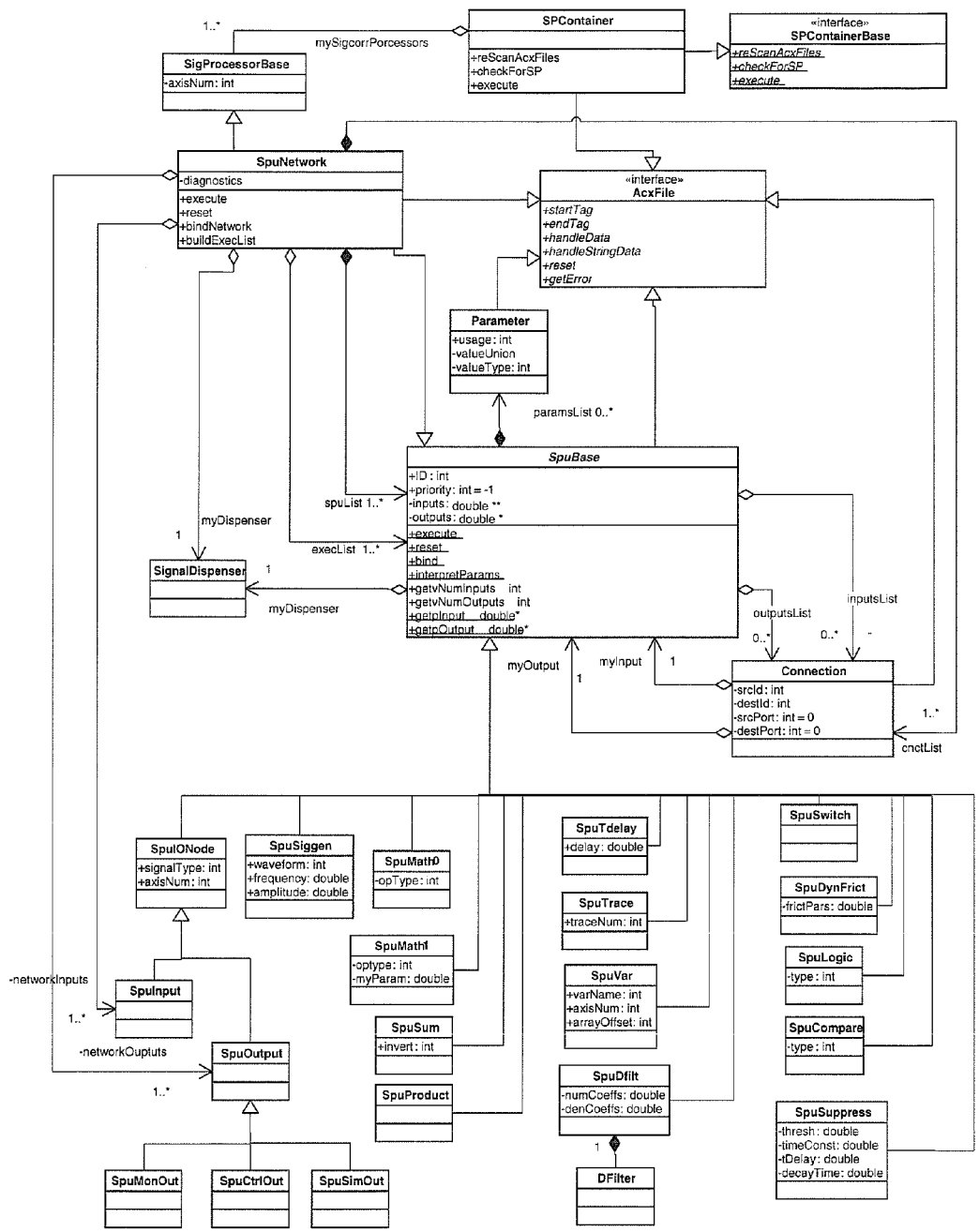
FIG. 1 is a class diagram of the relationships between classes defined for use in an SPN according to the exemplary embodiment 100 of the present invention.

Embodiments of the invention provide a device, system, and method for generating a signal processing network (SPN) for deployment on a motion control system. The signal processing network may be composed of signal processing units (SPU's) and signal flow connections (CNCT) for routing computed results of one SPU to inputs of other SPU's. The network evaluates the specified computations cyclically in a real-time event. A data format may fully specify the network topology, types of processing equations, and parameterization of equations without any requirement for creating new executable code. The computation network may be generated from the data format definitions by the motion control system as needed.

The signal processing network (SPN) allows for field installation onto a motion control system of a general purpose computation network whose topology, equations, and parameterization are fully specified by a format (for example XML file). This is advantageous in situations where the required signal processing equations cannot be known in advance and creation of new executable code is not an option due to a need for on-the-spot deployment.

Process Monitoring

A motion control system may contain internal variables that represent the positions, speeds, and forces of drive actuators. Examples of drive actuators include electric motors and hydraulic cylinders. The motion control system is regulating the position or speed of a mechanism associated with some type of process, then the signals (internal variables) can contain information about the forces generated by the process. Some example processes are machining, grinding, forming, and injection molding. The signals may contain some component caused by the process and another component related to the machine. Forces related to the machine may be due to some manifestation of friction, inertia, gravitation, deflection/compliance, and mechanical resonance. In order to achieve high fidelity representations of process forces based on internal control variables, the effects due to the machine must be detected and separated from the effects due to the process. The signal processing network described in the current invention may be used for that purpose. The SPN may also be used to detect situations where the ability to distinguish between process related forces and machine related forces is compromised. Since the dynamics of a motion control actuator and the driven mechanical system can vary widely with different machine designs, a general mechanism for a reconfigurable signal processing network is preferred. The outputs from such a network are the estimates for the process forces. Auxiliary outputs that indicate an assessment in the confidence of the validity of the estimates are also a possibility. This application of an SPN is generally referred to as "signal correction" as it corrects the internal variable to improve its ability to represent the process forces. The output from signal correction is a signal that is consumed by some process monitoring task. Some examples of process monitoring tasks are:

Alarm as the process deviates from a predetermined range of operation,

Process control by changing command variables to keep the process within a pre-determined range, and Process measurement for improved understanding by process engineers.

Failure Detection

A machine with moving parts can fail in any number of ways. Some examples are bearing failure, shear failure of drive train components, belt breakage, coupling slippage, and collisions of some part of the machine with the environment or with part of the machine itself. All of these failures occur as a nearly instantaneous event. When a machine is controlled by a motion controller, there is an opportunity to detect instantaneous failures by augmenting the control functionality with monitoring features. Monitoring may be accomplished by processing signals derived from internal drive variables or from external sensors such as accelerometers. Immediate detection of sudden catastrophic failures requires real-time monitoring of the available signals and processing the signals with suitable equations, filters, transformations, threshold check, etc. to identify signatures that correspond to a possible failure mode. In such cases the signature for identifying a failure strongly depends on the failure mode and the construction and type of machine. Thus the high level of flexibility provided by an SPN may be highly advantageous for such application.

Conversely, systems that attempt to predict the gradual onset of failure based on long term trending of data need not implement the required processing for signature detection in a real-time environment. In such cases, the raw signals may be collected to a database for later post-processing. The lack of immediacy of the failure provides an opportunity to test various algorithms for signal processing applied to a collection of data records obtained over a long term (non-real-time) interval. In such cases the SPN is still advantageous as it may be deployed in the off-line environment. The SPN may be used off-line to transform raw measurements into data more closely associated with variables that indicate gradual degradation of machine components.

Off line deployment and on-line deployment are combined by installing a failure detection network that is highly sensitive and would be expected to occasionally generate false alarms. In this use case, the result of an alarm condition may be to do nothing more than to trigger storage of a data collection buffer that had been constantly updated during normal operation of the machine. The data collection buffer would contain an appropriate set of raw signals. Data records could then be manually flagged as either representing a real failure or a false alarm. Next, all records can be piped through candidate signal processing networks with a goal of designing a network that optimizes the trade off between detection sensitivity and immunity to false alarms.

Servo Control

Servo control refers to the methods used to regulate position, velocity, and acceleration of some moving member of a machine. Servo control's primary functions are to reject disturbance forces and to track command trajectories. Disturbances are rejected by means of feedback of one or more of state variables for position, velocity, and acceleration from sensors. The sensor signals are utilized in developing commands to actuators (e.g. motor drives) in response to these measurements. Trajectory tracking is also accomplished by feedback control, but augmentation of feedback control with feed-forward control is a common practice to improve the tracking performance. Feed-forward control may develop actuator commands based only on set-point trajectories.

Commercial controllers may have a limited number of available controller topologies for speed control and position control. A common topology is cascaded control where the speed control loop is nested inside a position control loop. Within this topology various computation blocks with fixed inputs and outputs are provided for gains, filters, reference models, and feed-forward controllers. For many machines, the flexibility provided by a limited number of fixed topologies and filter types is sufficient as the machine conforms to a certain range of dynamic behavior, and the pre-configured topology is capable of effective control. In such cases it is the responsibility of a setup engineer or technician to "tune" the machine by choosing which of the available capabilities to deploy and to configure these filters with an optimized set of numeric values.

The SPN offers the possibility that a setup engineer who is competent in control theory may design a customized feedback and/or feed-forward controller. The controller may have a unique topology that is the invention of the setup engineer. The topology may be designed specifically for a machine whose dynamic behavior is not optimally compensated with one of the finite sets of pre-configured topologies offered by the standard control software. The configurable signal processing network allows this engineer to specify a controller without requiring development of any software. In this way an optimized controller may be developed at the machine where its design is based on a machine dynamics model developed on the spot based on measurements. The current invention includes the possibility for using a graphical software tool for generating the definition data for the signal processing network. Such a software tool involves using a mouse to select and place blocks representing SPU's and routing lines representing signal flow between blocks. The SPU blocks provide input fields for entry of parameter values. The SPN provides SPU types specifically for the servo control application. These SPU types allow the signal processing network to offset and/or overwrite position, speed, acceleration, and torque set-points in the feedback and feed-forward paths of the control system.

Simulation

Simulation may be used to refer to executing the entire software set for a motion control or CNC system in a non-real time environment for the purpose of in-advance testing of the system's response to motion control programs. For example, in the case of CNC control, simulation can validate that the NC programs generate the correct geometry at the workpiece. In some cases the fidelity of a simulation may be improved by including the influence of the dynamics of the controllers and the driven mechanical system. It is in such cases where the SPN would be utilized. In one example, SPN may take as its input the speed set-point that may be routed from a position controller to a speed controller. The role of the network may be to simulate the dynamics of the speed controller, motor, and machine. In this example, the output of the SPN is an estimate of the output from the position feedback sensor. The estimated value for the position feedback is then routed to the built-in position controller of the standard control system software so that the normal position control algorithms configured on the control could operate on this simulated feedback. An additional output from the signal processing network could be an estimate for the position of the action point of the machine to be used in modeling the geometry of the machined surface. In the previous example the signal processing network simulates the dynamics of the speed control, current control, and the mechanical system, while allowing the native position controller software to run as it would on a normal machine. Other simulation scenarios are also understood. For example, the SPN can take as its input the position command trajectory and include simulation of the position controller. Another manifestation is to provide the SPN with current set-point values from the built-in speed controller and the SPN's role is to simulate the dynamics of the current controller, motor, and driven mechanical system where SPN outputs are motor speed and direct encoder position.

Many of the concepts described herein may be implemented as C++ software in the framework of a Compile Cycle for Sinumerik 840D. The SPN implementation is part of an environment for providing underlying facilities for process monitoring and failure detection applications.

Object Oriented Design

As mentioned, the signal processing network (SPN) is composed of signal processing units (SPU's) with signal routing between SPU's represented by connections. Each of these concepts may be represented using principles of object oriented design. In order to represent these concepts graphically, the Unified Modeling Language (UML) may be used. Descriptions of UML are public knowledge. Familiarity with UML class diagrams may be required to properly interpret the figures in this disclosure.

Referring to FIG. 1, a UML class diagram describes the relationships between classes defined for use in an SPN. The diagram contains a very large amount of information and describes one preferred way of organizing the concepts. Descriptions and explanations for each of the elements in the diagram are provided herein.

SpuNetwork

A high level overview of the class diagram begins with examination of the class SpuNetwork. The central concept of a network of SPU's is represented by the class SpuNetwork. The diagram depicts how an instance of SpuNetwork contains a number of objects of class SpuBase in a SpuList and a number of objects of class Connection in a list called cnctList. SpuBase is a pure virtual class and may be represented concretely by any of the derived SPUxxxx classes depicted near the bottom of the figure. The SpuNetwork also contains a list of references to SPU objects execList to represent an execution list. The order in which the computations may be executed is the order in which the SPU's are referenced in the execList. The SpuNetwork also contains arrays of references to networkInputs and networkOutputs. These references point to specific derived SPU types that represent required inputs and provided outputs. The networkInputs list may be used to request services from a component of the underlying software called the SignalDispenser. The SpuNetwork registers all required signal/axis combinations from the SignalDispenser based on the instances of SpuInput in the network. The SignalDispenser retrieves and saves the values for its registered signal/signals during the cyclic axis control process. The networkOutputs list may be used by the SpuNetwork to report to potential clients the capabilities of the network. This may be significant because multiple networks each serving a different role may and will be instantiated on the control simultaneously. In the case of process monitoring, the monitoring algorithm may request a specific axis/signal combination as a basis for monitoring.

The SpuNetwork may be built up during a non-time critical background process on the control. The network is built up by parsing a data format that is a binary representation of XML known as ACX. For this reason it inherits from an ACXFile class that is called by an event-based parser. The details of data parsing are discussed later. The instances of SPU's and connections are developed during data parsing and are stored in flat lists. The bindNetwork( ) method of SPUNetwork is invoked from the background process after all contents of the definition data have been parsed with having encountered no error conditions. One purpose of bindNetwork( ) is to attach the connection objects to the appropriate SPU objects, and to navigate the connection objects to determine references to the floating point numbers that act as output values from a source SPU that serve as inputs to the destination SPU. The SPU object contains value member data for its own outputs and reference member data to point to outputs from other SPU's that serve as its inputs. Any error conditions that occur during bindNetwork( ) may cause a bind failure, and appropriate diagnostics information may be reported to a diagnostics data storage. Examples of error conditions that might be encountered during bindNetwork( ) are loose connections, SPU inputs or outputs missing required connections, invalid multiple attachments to a single SPU input connection, as well as several others. During the bind process each instance of class that derives from SPUBase has its bind( ) method invoked. The bind method gives each SPU object a chance to verify that the input and output connections present correspond to the number of connections expected. Each SPUBase derived object may also be required to provide methods getpInput( ), and getpOutput( ). These methods are used to populate the references to one SPU's outputs held by another SPU's inputs. Once the connections are navigated, they may no longer be needed by the network. The data flow for the time-critical cyclic process is established by dereferencing an SPU's input references. This may be computationally more efficient than navigating the connections.

The function buildExecList( ) is another method of SPU-Network that may be intended to be invoked from the background process after a successful call to bindNetwork( ). The buildExecList( ) method arranges the instances in the networks spuList in order of priority of execution. This may be done by evaluating a priority property attached to each SPU, and sorting the SPU's in order of priority. SPU's that share the same priority level are added to the execution list in the order in which they appear in the SPU list. Alternatively, the priority may be established automatically by recursively determining dependency between blocks by beginning at the network outputs and reverse navigating the connections from SPU output to SPU input.

During the cyclic time critical process, the network may be executed via a call to the execute( ) method of SPUNetwork. This method simply cycles through the execList and invokes the execute( ) method of each SPU instance. The execute( ) method of each SPU then de-references its inputs, executes the appropriate equation/logic on the combination of inputs, and places the result at the SPU's output so that it may be consumed by other SPU's that depend on this data item for input value.

Interface to Base Software

The interface between the SpuNetwork and the remainder of the motion control system may be comprised of the SignalDispenser, SPContainerBase, and ACXFile. The SpContainerBase may be a pure virtual class whose role is to act as a container for signal processing objects. A concrete implementation of the SpContainerBase interface represents a set of capabilities for performing the signal processing requirements for monitoring, control, and simulation applications. The SPContainer object implements interface methods which include primarily: reScanAcxFiles( ), checkForSP( ), and execute( ).

The method reScanAcxFiles( ) of SPContainer may be invoked from the background process and commands the parsing of all definition data associated with signal processing. The result of this method is the instantiation of a number of signal processing objects which derive from SigProcessorBase. Due to its flexibility, the primary class derived from SigProcessorBase is SpuNetwork. Nevertheless, it is also possible to derive other classes whose topology and equations are fixed for a dedicated purpose, where only the parameterization is specified in the definition data. It is also conceivable that additional classes which might use auto-generated code or some other mechanisms for flexibility can derive from SigProcessorBase. Each attempt at generation of a SigProcessorBase object results in a diagnostics data output that describes the success of the attempt and provides information for diagnosing any problems that may have occurred during parsing. The instances of SigProcessorBase-derived objects reside as member data of SPContainer. The method checkForSP( ), as implemented by SPContainer, searches the list of all instances of SigProcessorBase-derived objects for one that meets the supplied requirement of signal type/types and machine axis. When a match is found, the SigProcessorBase's clients list is incremented and a unique key is returned. As instances of SigProcessorBase are created they are provided access via a pointer to a central service from the base software: SignalDispenser. The SignalDispenser serves two purposes: 1. it provides the signal processors with required signals from the base system and 2. it provides a repository for the results of the signal processing. In its role as a repository, the signal dispenser provides interfaces for assigning network outputs to signal traces, methods for over-writing actual values for simulation purposes, and methods for overwriting or augmenting control outputs for servo control purposes. The execute( ) method of the SPContainer may be called cyclically by the base system during the time-critical high priority cyclic process. The container then invokes the execute( ) methods of all its SigProcessorBase objects. The final interface to the base system is provided by inheriting SPContainer from AcxFile. The AcxFile class provides an interface for opening a selected data record from the control's file-system and beginning the parsing of the data. During parsing, events such as startTag( ), endTag( ), handleData( ) are invoked by the parser and the implementation of each of these methods in a derived class decides what to do with this information. A discussion of some strategies used during data parsing and the organization of the ACX data is discussed later herein.

SPUBase I Connection

The central object in the SPUNetwork is the SPUBase. This may be a pure virtual class that supplies some non-virtual methods along with pure virtual methods. Much of the contents of this class have been discussed earlier under the topic of SPUNetwork. Each instance of a SPU may be required to contain a unique ID for the purpose of identifying the SPU during network construction. The uniqueness of the ID may be enforced during data parsing. Each instance of a SPU contains an array of real-valued numbers (outputs) for holding zero to several outputs of the SPU. The size of the array is variable depending on the SPU type. The SPU also contains an array of pointers to real-valued numbers (inputs) that ultimately would point to outputs from other SPU's that provide inputs to the present SPU. The size of the inputs array is also variable depending on the SPU type. An SPU also contains zero or more instances of parameter objects. The number and contents of the parameter objects depend on the concrete type of SPU. Parameter objects are constructed during data parsing as the presence of parameters are encountered in the definition (ACX) data. Once the list of parameters indicated in the ACX data is exhausted, then the interpretParams( ) method of the concrete SPU is invoked to check that the parameters found conform to what would be expected in terms of variable type, number of parameters, parameter usage, and range of values. If the parameters are what would be expected, then interpretParams( ) for each concrete SPU would copy the values from the Parameter object into its own member data for use during execution of its methods bind( ) and execute( ). The parameter member data: "usage" enumerates how each parameter relates to its usage in the derived SPU class. Parameters may contain values of variable type: e.g. double, int, char, .etc. The UML class diagram indicates an inheritence relationship between SpuBase and SpuNetwork, where SpuNetwork is a kind of SpuBase. Such a relationship allows for an SpuBase instance to incorporate an entire nested SpuNetwork and treat its input output behavior identically to the way it treats a single concrete SPU. In the context of the network in which the SPU is contained, it behaves as any other concrete SPU. In such a case the ID of the SpuBase instance that is a network is unique within the context of its network while the IDs of the SPU objects contained within the sub-network need not be unique relative to SPU objects at different context level. Such a mechanism allows for limitless nesting levels. One advantage of such an arrangement is that sub-networks that represent a specific input-output relationship may be built up in advance from more basic SPU's to be included in a network as needed.

The SpuBase also contains lists of connection objects: inputsList and outputsList. Each connection object has information about its source and destination and represents a data-flow channel. Each connection identifies its source SPU using the unique integer ID for the SPU and identifies the source output port outport that identifies which of the available outputs from the SPU to be referenced. For SPU's that have multiple outputs, the output number refers to a specific kind of information. The output number may be referred to indirectly by providing the connection with an enumerator or a string that more directly identifies the role of the output port in the context of the concrete type of SPU. Each connection object also contains the unique ID of the destination SPU and the number of the input port: inport on the destination SPU to which the connection should be attached. As with the outport each numbered inport contains a certain kind of signal that is interpreted uniquely by the concrete SPU. The inport may be referred to using a string or enumeration that more clearly identifies the usage of the input to which to attach the connection. Parsing of SPU's and connections can take place independently, where the relative occurrence of SPU's and/or connections in the definition data have no impact on the network topology or on the ability of the parser to determine the connection mapping. After all objects in a network: SPU's and connections are instantiated, the network is built up during execution of the SpuNetwork's bindNetwork( ) method. The first step may be to find the connections associated with an SPU's inputs and outputs. It is during this first step that an SPU's members outputsList and inputsList may be populated. Simultaneously the connection's myOutput and myInput pointers to SPU's may be established. At this stage, if a connection's data cannot be resolved to SPU/port combination an error condition occurs and the SPU network may fail to build. If, for example, two separate connections have the same destination SPU and "inport" an error condition is detected and is indicated in a diagnostics output data. Conversely, two separate connections may legitimately be attached to the same source SPU and outport as this simply means a fork or branch in the network. After the relationship between SPU's and their connections are established, the second step in bindNetwork( ) is to invoke the bind( ) method of each SPU so that it may check for the presence of required connections and can validate the connections with other information that might, for example, be derived from the parameters. It is also at this time that the reference of one SPU's inputs to outputs from one or more other SPU's is resolved by invoking the source SPU's getpOutput( ) method. This is accomplished by navigating the various connections held by the destination SPU. At the end of this process the connections have served their purpose and may be deleted from the network in order to conserve dynamic memory.

Additionally, each of the classes: SPContainer, SpuNetwork, Parameter, SpuBase, and Connection all may derive from the class AcxFile. This is to accommodate parsing of the definition data (ACX). As will be described later, the ACX data is organized hierarchically (typical of XML) such that the context of the location of data in the definition format relates directly to the object whose parse methods (e.g. startTag( ), endTag( ), etc.) is to be invoked by the event-based parser.

Data Format & Parsing

The definition of the signal processing network may be retained in a data definition whose format is known as ACX. ACX may be but is not limited to an proprietary binary format provided by Siemens. The structure is closely related to XML. Like XML, ACX uses tags to delimit content. The content can be simple or compound. For simple content, the data type is specified as an attribute. Siemens provides a converter tool for converting from XML to ACX and from ACX to XML. For the sake of clarity, the XML representation of the data is the focus of the present discussion on data format and parsing for signal processing network definitions.

Referring to FIG. 1, several classes may inherit from the pure virtual interface AcxFile. These classes form a containment hierarchy as indicated by the following list starting from the outermost class. Multiple instances of a contained object are possible as long as their location is specified as possible according to the following schema. (Classes that exist at the same level may appear in any order.)

SPContainer
  SpuNetwork
    Connection
    SpuBase
      Parameter
      SpuNetwork The parsing of the ACX data is begun by passing the base software an indication of the data location (e.g. in a named file) and a reference to the top-level object that implements the interface of AcxFile. As the data is parsed, event callbacks for startTag( ), endTag( ), handleData( ), handleStringData( ) are invoked on the top level object. The method startTag( ) may be invoked each time a new tag is encountered, and a tag name enumeration is provided. The method endTag( ) may be invoked each time a new end tag is encountered it also passes an enumerator for tag name. The method handleData( ) may be invoked whenever the parser encounters simple content data. HandleData( ) may be called with arguments for data type, and a union argument that contains the value. In cases where the data type is a string, handleStringData( ) is invoked.

For the signal processing network, the top level object may be SPContainer. SPContainer then decides what to do in response to each of these events. During parsing, each type of class in the containment hierarchy keeps track of the parsing context by maintaining a stack of objects that represent the instantaneous context of the containment hierarchy. The object stack corresponds roughly to the stack of tags that represents the context in the XML complex content. During parsing, the methods for startTag( ), endTag( ), and handleData( ) are invoked for the object at the top of the context stack. During execution of a startTag( ) method, the context stack can potentially have a new objects pushed on to the top of the stack During execution of a endTag( ) method, the context stack can potentially have the top object popped off of the stack. Schema checking may also be performed during parsing to ensure that the start tags, are located as expected according to the requirements of the XML format. If an error condition is encountered, an errorInfo object may be updated with information to be later reported as diagnostics output. Once a single error is encountered, successive attempts to parse the contents of the SPContainer may be ignored, thus the first error condition that occurred in the SPContainer is described in the errorinfo. As the XML content indicates the need to instantiate a new object, dynamic memory management may be employed to construct the required instance of the object. If the object is a derived type of SpuBase, then a SpuFactoiy object may be invoked to construct an instance of SPU whose type is that specified according to the content of the XML. The SpuFactory returns a pointer to an object of type SpuBase, this pointer may then be pushed on to the top of SpuNetwork's context stack, such that successive invocation's of SpuNetwork's methods for file parsing can be redirected to the SpuBase's corresponding methods.

Partial List of SPU Derived Types

Referring to FIG. 1, the low portion shows a number of classes that derive from SPUBase. These represent a partial list of concrete SPU's. The object oriented design allows for the number of available SPU's to be extended with a minimum of effort. The process of creating a new SPU derived class involves filling in the contents of a pattern class with the requirements specific to the purpose of a new SPU type. A partial list of some SPU types that have been developed for some of the applications outlined in section B is presented here. The details of each SPU's implementation can be provided upon request.

SpuInput

The SPIinput SPU represents an input signal from the base control. The block may be parameterized by an enumeration for signal type and by the index of the machine axis from which the signal is to be retrieved. The SPU has zero inputs and one output. Some signal types that may be enumerated, for example but not limited to, are:

Position set point and its derivatives
Position actual value at motor
Position actual value at direct measurement system
Speed set point to speed loop
Speed feedforward
Torque feedforward
Torque set point to current control
Torque producing current actual value
Motor speed actual value
Drive Power
Values from A/D converter SpuMonOut The SPUMonOut SPU represents an output node from the SPUNetwork. The purpose of this output node is to provide a signal for use by monitoring applications. In one embodiment, the monitoring application runs at a lower rate cyclic process and the contents of the network's outputs are delivered to the monitoring task by placing the output signals in a inter-process communications buffer where the lower rate process can retrieve and consume the results. The SpuMonOut has one input to represent the signal value and zero outputs. It is parameterized by axis number and signal type. The available signal types are comparable to those listed under SPUInput. In this case, it is expected that the signal contents are influenced by a model for the axis dynamics as implemented by the SPUNetwork.

SpuCtrlOut

The SpuCtrlOut SPU may be used to effect axis/servo control when the SPUNetwork is executed. The SpuCtrlOut may have one input and this input is routed to a control signal in the systems position and/or speed controller by a service from the SignalDispenser. The SpuCtrlOut is parameterized by the axis and an enumeration of the control signal. Some examples of control signals are listed below.

Position Command Offset
Position Command
Speed Feedforward
Speed Feedforward offset
Speed Command
Speed Command offset
Torque Feedforward
Torque Feedforward Offset
Speed controller proportional gain
Speed controller integration time constant SpuSimOut The SpuSimOut SPU may be used for the purposes of simulating feedback in an environment where the controller's software set runs without motors, and/or a mechanical system, and or direct feedback devices. The SpuSimOut may be quite similar to the SpuCtrlOut as it calls on services from the SignalDispenser to affect the system. The SpuSimOut has one input, no outputs, and is parameterized by axis number and feedback type enumeration. Some example enumerators for feedback type are listed below.

Position Actual Value at motor encoder
Speed actual value at motor
Position Actual Value at Direct Measuring System
Drive internal Torque Set-Point
Drive internal Torque Producing Current SpuSiggen The SpuSiggen SPU provides the ability to generate signals for testing purposes. It also may be used to excite the electromechanical system for the purpose of measuring dynamic response. The SpuSiggen takes 0 or 1 inputs and may be parameterized by an enumerator for waveform, a value for amplitude, and a value for frequency. If there is no input attached to the SPU, then the frequency for the waveform is developed based on the numeric parameter. If there is an input, then the frequency may be derived from the input to allow for variable frequency signals as specified by signals originating from elsewhere in the network. Some enumerator values for wave form are SINE, SAWTOOTH, TRIANGLE, SQUARE, UNIFORM_RANDOM, NORMAL_RANDOM, etc.

SpuMath0

The SpuMath0 SPU performs a mathematical operation on its single input signal where the mathematical operation does not require any parameterization (Math0 refers to 0 numeric parameters). The SpuMath0 block takes a single enumeration parameter to identify the type of mathematical operation to perform. Some examples of math operations using zero parameters are listed below.

Squareroot
Sine, cosine, tangent, arcsine,
loge, log 10, exp
1/x
derivative, integral
absolute value SpuMath1

The SpuMath1 SPU performs a mathematical operation on its single input signal where the mathematical operation requires a single numeric parameter. The SpuMath1 block takes an enumeration parameter to identify the operation type and a numeric parameter to parameterize the operation. Some examples of operation types are listed below.

Multiplicative gain
Additive offset
Power: x^y
Non-linear dead-zone function
Non-linear saturation function SpuSum The SpuSum SPU adds the values of all input signals and reports the sum as an output. The number of input signals is unlimited. Optional parameters may be used to specify the inports where the signal value should be subtracted rather than added. The implementation of this block minimizes the real time computation requirement by gathering and segregating all adding inputs from subtracting inputs during the block network bind process as a background non-time-critical process. In this way only additions and subtractions are performed cyclically without any multiplication or if-then-else logic.

SpuProduct

The SpuProduct SPU has a variable number of inputs and simply multiplies all inputs together to determine the value of the output.

SpuSwitch

The SpuSwitch SPU provides a mechanism for selecting from a number of input signals a single signal to be passed through the SPU as an output signal. The signal on the first input to the SpuSwitch is treated as the selector; its value dictates which of the remaining input signals to pass through to the SPU's output. The number of inputs to SpuSwitch is variable: there may be required any where from 2 to an unlimited number of inputs. The first input that operates as the selector is designated as input 0. The value of input 0 is truncated to a whole number. It indicates which of the remaining inputs to pass through. If the value of the truncated input 0 is less than one, then it passes through input 1, if the value is greater than one less than the total number of inputs, then the switch passes through the highest numbered input.

SpuTdelay

The SpuTdelay outputs the input signal from some previous time where the length of the delay is specified as a parameter. The SpuTdelay may be parameterized in terms of either time or number of cyclic intervals. The block has a single input, a single output and two parameters. The first parameter indicates the units of the second parameter: either seconds or ticks, and the second parameter specifies the duration of the delay. The delay may be accomplished by allocating memory for a buffer large enough to hold the data history from the newest input to the oldest input, where the oldest input is one plus the integer number of cycles to delay. A delay that involves a fraction of an interval is accomplished by a straight-forward and well know method of performing a two point weighted average on the oldest and second oldest measurements:

$$y(k)=x(k-nd-1)*a+x(k-nd) \qquad (1\text{-}a)$$

where y(k) is the newest output and x(k) is the newest input, x(k-m) is a delayed input, nd is the integer part of the delay time in units of cycles, and a is a number between 0 and 1 that represents the fractional part of the delay as represented in units of cycles.

SpuTrace

The SpuTrace SPU may provide a mechanism for interacting with the base software's signal trace capability. Typically the SpuTrace block may be inserted by branching off of a connection in the network to accommodate measurement of an internal network signal (state variable) for external display and analysis. The SpuTrace is parameterized by Axis number and by a trace ID. Multiple SpuTrace's in a single network and multiple SpuTrace's in across multiple networks are all possible.

SpuDfilt

The SpuDfilt SPU provides a general purpose discrete time linear filter capability. The filter's difference equation may be represented by the following where the filter step time is the cycle time of the periodic real-time process in which the filter runs.

$$y(k)=b0*u(k)+b1*u(k-1)+ \ldots +bm*x(k-m)+a1*y(k-1)+ \ldots +-an*y(k-n)$$

The values for the moving-average coefficients (b) and auto-regressive coefficients (a) are specified by listing the coefficients as instances of "numerator" (b) and "denominator" (a) Parameters in the definition data. The number of occurrences of numerator parameters specifies m and the number of occurrences of the denominator parameter specifies n. The location of each coefficient is inferred from its location in the parameter list. The implementation of the discrete filter avoids transients as the filter first runs by passing a partially filtered input to the output until all internal states are stabilized. The internal states are assigned values by assuming that the initial input value (u) has persisted long enough for filter states to assume steady state. Details of these algorithms can be provided at a later date.

The SpuDfilt SPU may use a general purpose filter class to implement the initialization memory management and run-time methods of the filter. This class is utilized elsewhere in process monitoring applications in cases where monitoring tasks call in filtering capabilities.

Continuous Time Filters

Additional SPU Classes that represent the filter as a continuous time transfer function are available. These are useful in situations where network portability relies on the ability of the network behavior to be consistent with changes in control settings. Specifically, continuous time representation of filters will allow for consistent behavior when the cycle time of the process in which the filter runs is changed. Continuous time representations may require that a discrete filter be represented by a sequence of the following types in combination: first-order filters, second-order filters, and pure time lags. The combination of continuous time filters are converted to an instance of a discrete-time equivalent (i.e. the filter class used by SpuDfilt) in the background process as the network is built up during data parsing. The discrete time equivalents are generated via well-known mapping procedures such as "Tustin's Trapezoidal Integration", "Matched Zero-Pole", and "Step Invariance." Higher level SPU's for constructing specific types of filters such as PT2 (second order low pass), Notch (band-stop), DT2 (second order high pass), etc. are also made available by providing SPU's that serve as continuous time filter blocks that through parameterization may be configured to represent the desired type.

SpuVarIn

The SpuVarin SPU may provide a mechanism for associating a network signal with a global variable from the base system. SpuVarin has no inputs, one output, and parameters to identify the data source. In one embodiment, SpuVarin is parameterized by three parameters: type, row, column of the global variable whose value should be passed as the single output of the SPU. In such a case, the system provides arrays of variables of a variety of types such as integer or floating point numbers and the output of the SpuVarin is the value of the entry into the specified array. Such a mechanism accommodates real-time tuning of the signal processing network as it is running. For example, routing of SpuVarin's output as the selection input of the switch allows the variable to enable and disable subsections of the signal processing network. Routing SpuVarin's output to a SpuProduct block effectively creates a settable gain, and routing to a SpuSum block creates a settable offset. In one embodiment the global variables referenced by SpuVarin can be modified by the controller's motion program, PLC, or HMI components.

Spu Dynfrict

The SpuDynfrict may provide a SPU that models the complex nature of non-linear friction forces as a function of position, velocity, and acceleration inputs. A detailed description of the friction model employed may be the topic of a separate invention disclosure.

SpuCompare

The SpuCompare may perform a logical comparison on its two inputs. It compares the value of the first input to the value of the second input and outputs a 1 if the comparison evaluates to TRUE and a 0 if the comparison evaluates to FALSE. A single parameter enumerates the type of comparison operation: >, <, >=, <=, =, !=.

SpuLogic

The SpuLogic performs a Boolean operation on its multiple inputs. The type of operation may be specified by a single parameter that enumerates AND, OR, NAND, NOR, EOR. The output of the SpuLogic SPU is the result of the logical operation on all inputs. Such a block is useful in decision making based on the results from a number of SpuCompare evaluations. Some anticipated useful routing of the output of a SpuLogic element is the selector input of a SpuSwitch or the state input of a SpuSuppress element.

SpuSuppress

Signal suppression denotes a mechanism for indicating that the network output for process monitoring should be suppressed to command that monitoring algorithms not issue alarms during the duration of a suppression condition. The SpuSuppress element may use a strategy of manipulating the signal during the duration of conditions where suppression is desired. Signal suppression is performed by holding the signal level at the value that existed when the suppression state was entered. When the suppression condition ends, the held signal is gradually transitioned from the held value to the instantaneous value. The gradual transition is accomplished using a low pass filter whose time constant is gradually decreased over the transition period. This concept has been deployed and used in process monitoring products for several years for the specific purpose of suppressing spindle torque and power measurements during spindle run-up. In the current implementation the concept has been generalized by the SpuSuppress element. The SpuSuprress element takes two inputs: the signal to suppress and a logical input where 0 indicates the normal condition and 1 indicates the suppression condition. Inside the execute method of SpuSuppress is a finite state machine to manage the value output by the SPU. Details of this design can be made available if necessary.

Automated Generation of a SPN

For descriptions of machine behavior/dynamics whose model structures are known and/or fixed in advance, the class and topology of a collection of SPU's in a signal processing network may be generated based these models. In the case of process monitoring, the SPN would represent a run-time simulation of the model. In the case of servo control, the model is used as a starting point in an auto-tuning procedure whose job is to parameterize the SPU's.

Auto-setup is a process where the parameterization of the model can be determined automatically by analyzing measurements of controller state variables as the machine reacts to excitation conditions. In some cases, the excitation conditions can be contrived in advance and intentionally created in the system. In other cases the excitation conditions may occur naturally during the normal processes performed by the machine. In either case, if the excitation is sufficiently "rich", then measurements from an appropriate set of available signals may be analyzed using methodologies of system identification to determine an optimum parameterization of the model. Once this step has been completed, the model information can be converted directly into a corresponding ACX data format to define a SPN that represents a simulation of the model (for process monitoring and certain failure detection applications). In servo control applications, the model is employed to derive the parameterization of SPU's in a SPN topology for controlling the axis. In either case the ACX data for defining the network can be generated automatically and automatically installed on the controller. In certain cases the topology of the SPN might not be fixed in advance but is selected based on the specifics of the model generated during the system identification process. Facilities for visualizing the topology represented by the ACX file have also been developed. Details of the auto-setup process will be discussed as part of a separate disclosure.

Referring to FIG. 2, an exemplary method according to a first exemplary embodiment 200 of the invention provides a data format using existing compiled and linked code. Each signal processing network supplies one or more signal processing units (block 202) as previously described. The data format may be XML or other suitable language. The signal processing units provide a dedicated interface with the motion control system (block 204). Each signal processing unit is supplied with multiple inputs and multiple outputs (block 206). The inputs and the outputs are routed between the one or more signal processing units (block 208). The input and output may relate to monitoring a motion control system, operating a motion control system, operating a failure detection systems, and/or simulating a motion control system.

The systems and methods may be implemented using hardwired modules or programmable hardware. The systems and methods may be implemented within software that utilizes various components to implement the embodiments described herein. Aspects disclosed in the exemplary embodiment may be utilized independently or in combination with other exemplary embodiments. Moreover, it will be understood that the foregoing is only illustrative of the principles of the invention, and that various modifications can be made by those skilled in the art without departing from the scope and spirit of the invention. Persons skilled in the art will appreciate that the present invention can be practiced by other than the described embodiments, which are presented for purposes of illustration rather than of limitation, and the present invention is limited only by the claims that follow.

What is claimed is:

1. A system for generating a signal processing network comprising:
    a plurality of signal processing units, each of the plurality of signal processing units comprising a respective instance of a signal processing unit base class, the signal processing unit base class comprising already existing pre-compiled and linked code, each signal processing unit having multiple inputs and multiple outputs; and configuration data wherein the signal processing network uses the data to configure the already existing pre-compiled and linked code for each of the plurality of signal processing units; and
    one or more signal flow connection(s) for routing the outputs of at least one of the signal processing units to the inputs of at least another one of the signal processing units based on the data; and a dedicated interface connected to at least one signal processing unit and comprising hardware connected to a motion controller of a motion control system.

2. A system of claim 1, wherein the inputs and outputs of each signal processing unit relate to monitoring the motion control system.

3. A system of claim 1, herein the inputs and outputs of each signal processing unit relate to a failure detection system.

4. A system of claim 1, wherein the inputs and outputs of each signal processing unit relate to operating the motion control system.

5. A system of claim 1, wherein the inputs and outputs of each signal processing unit relate to simulating the motion control system.

6. A system of claim 1, wherein the data is in a data format comprising Extensible Markup Language (XML).

7. A system of claim 1, wherein the data specifies a signal processing topology.

8. A system of claim 1, wherein the data specifies types of processing equations used by the signal processing network.

9. A system of claim 1, wherein the data specifies parameterizations of equations.

10. A system of claim 1, wherein the data is in a data format, and further comprising:

a module for converting third party formats into the data format.

11. A method for generating a signal processing network deployed on a motion control system comprising:

supplying a plurality of signal processing units, each of the plurality of signal processing units comprising a respective instance of a signal processing unit base class, the signal processing unit base class comprising already existing pre-compiled and linked code, wherein the signal processing network uses data to configure the already existing pre-compiled and linked code for each of the plurality of signal processing units;

providing a dedicated interface connected to at least one signal processing unit and using hardware connected with the motion control system;

supplying each signal processing unit with multiple inputs and multiple outputs; and routing the outputs of at least one of the signal processing units to the inputs of at least another one of the signal processing units based on the data.

12. A method of claim 11, wherein the inputs and outputs of each signal processing unit relate to monitoring the motion control system.

13. A method of claim 11, wherein the inputs and outputs of each signal processing unit relate to a failure detection system.

14. A method of claim 11, wherein the inputs and outputs of each signal processing unit relate to operating the motion control system.

15. A method of claim 11, wherein the inputs and outputs of each signal processing unit relate to simulating the motion control system.

16. A method of claim 11, wherein the data is in a data format comprising Extensible Markup Language (XML).

17. A method of claim 11, wherein the data specifies a signal processing topology.

18. A system for generating a signal processing network for monitoring and controlling a motion control system comprising:

a data that specifies types of processing equations used by the signal processing network and parameterizations of equations;

a plurality of signal processing units, each of the plurality of signal processing units comprising a respective instance of a signal processing unit base class, the signal processing unit base class comprising already existing pre-compiled and linked code, each signal processing unit having multiple inputs and multiple outputs; and configuration data wherein the signal processing network uses the data to configure the already existing pre-compiled and linked code for each of the plurality of signal processing units; and one or more signal flow connections for routing the outputs of at least one of the signal processing units to the inputs of at least another one of the signal processing units based on the data; and a dedicated interface connected to at least one signal processing unit and using hardware connected to a motion controller of the motion control system.

19. A system of claim 18, wherein the data specifies a signal processing topology.

* * * * *